(12) United States Patent
Song

(10) Patent No.: US 10,569,917 B2
(45) Date of Patent: Feb. 25, 2020

(54) SEALING DEVICE FOR SECURING PACKAGING MATERIAL

(71) Applicant: Kyeong Keun Song, Gyeonggi-Do (KR)

(72) Inventor: Kyeong Keun Song, Gyeonggi-Do (KR)

(*) Notice: Subject to any disclaimer, the term of this patent is extended or adjusted under 35 U.S.C. 154(b) by 0 days.

(21) Appl. No.: 16/171,584

(22) Filed: Oct. 26, 2018

(65) Prior Publication Data

US 2019/0071202 A1 Mar. 7, 2019

Related U.S. Application Data

(63) Continuation of application No. PCT/KR2017/004461, filed on Apr. 26, 2017.

(30) Foreign Application Priority Data

Apr. 27, 2016 (KR) .................. 10-2016-0051594

(51) Int. Cl.
*B65B 51/06* (2006.01)
*B65B 61/20* (2006.01)
(Continued)

(52) U.S. Cl.
CPC ............ *B65B 51/065* (2013.01); *B65B 51/06* (2013.01); *B65B 61/20* (2013.01); *B65H 16/10* (2013.01);
(Continued)

(58) Field of Classification Search
CPC ....... B65B 51/065; B65B 51/06; B65B 61/20; B65B 61/202; B65B 57/00; B65B 7/02;
(Continued)

(56) References Cited

U.S. PATENT DOCUMENTS 2,867,066 A * 1/1959 Platt ...................... B65B 51/065
53/139.1
2,899,785 A * 8/1959 Gebhardt ................ B65B 51/04
53/138.1
(Continued)

FOREIGN PATENT DOCUMENTS

JP 2002-068107 A 3/2002
JP 2006-227670 A 8/2006
(Continued)

OTHER PUBLICATIONS

Decision of Grant, Korean Patent Application No. 10-2017-0053886, dated Nov. 30, 2018.
(Continued)

*Primary Examiner* — Chelsea E Stinson
*Assistant Examiner* — Thomas M Wittenschlaeger
(74) *Attorney, Agent, or Firm* — Nelson Mullins Riley & Scarborough LLP; Kongsik Kim

(57) ABSTRACT

Disclosed is a sealing device for securing a packaging material. The sealing device for securing the packaging material comprises: a tape supply reel for supplying a sealing tape to which an RFID tag has been coupled; and a sealing part for sealing, with the sealing tape, an opening of a plastic packaging material holding a product, wherein the sealing part adheres the RFID tag, which is coupled to one end of the sealing tape having the length for one use, to an adhesive positioned on the other end portion of the sealing tape having the length for one use, wherein the RFID tag is broken by the adhesive strength with respect to the other end portion when the sealing tape sealing the plastic packaging material is torn.

7 Claims, 21 Drawing Sheets

(51) Int. Cl.

| | | |
|---|---|---|
| *B65H 16/10* | (2006.01) | |
| *B65H 18/08* | (2006.01) | |
| *C09J 7/20* | (2018.01) | |
| *G06K 19/077* | (2006.01) | |
| *G06K 7/10* | (2006.01) | |
| *G06K 19/07* | (2006.01) | |
| *B65H 43/00* | (2006.01) | |
| *B65H 23/06* | (2006.01) | |

(52) U.S. Cl.
CPC ............ *B65H 18/08* (2013.01); *B65H 23/06* (2013.01); *B65H 43/00* (2013.01); *C09J 7/20* (2018.01); *G06K 7/10366* (2013.01); *G06K 19/07* (2013.01); *G06K 19/07758* (2013.01); *B65H 2701/377* (2013.01); *C09J 2203/338* (2013.01)

(58) Field of Classification Search
CPC ............ G06K 19/07758; G06K 19/07; G06K 7/10366; B65H 23/06; B65H 16/10; B65H 51/06; B65H 2701/377; B65H 43/00; B65H 18/08; C09J 7/20; B30B 15/047; B30B 15/044; B29C 2045/1768; B29C 66/4324; B29C 66/4332
USPC ... 53/52, 64, 67, 136.1, 136.3, 136.5, 137.2, 53/139.1; 100/231; 156/217, 288
See application file for complete search history.

(56) References Cited

U.S. PATENT DOCUMENTS

| | | | | |
|---|---|---|---|---|
| 5,199,794 | A * | 4/1993 | Lipes | B29C 65/02 383/71 |
| 5,706,928 | A * | 1/1998 | Neukam | B65B 61/202 198/349 |
| 6,050,622 | A * | 4/2000 | Gustafson | E06B 9/68 292/307 R |
| 6,334,765 | B1 * | 1/2002 | Ellinger | B29C 45/1751 425/149 |
| 6,857,714 | B2 * | 2/2005 | Hohberger | B41J 3/4075 156/350 |
| 7,193,517 | B2 * | 3/2007 | Dods | B65C 9/1884 340/572.1 |
| 8,262,828 | B2 * | 9/2012 | Grimes | B65C 9/1865 156/249 |
| 9,697,711 | B2 * | 7/2017 | McIntosh | G08B 13/2414 |
| 2001/0053396 | A1 * | 12/2001 | Kappelmuller | B29C 45/1761 425/589 |
| 2002/0023407 | A1 * | 2/2002 | Kellaway | B65B 51/065 53/139.1 |
| 2003/0189490 | A1 * | 10/2003 | Hogerton | B65B 51/067 340/572.8 |
| 2005/0167024 | A1 * | 8/2005 | Sanzone | B65C 9/1884 156/64 |
| 2009/0126861 | A1 * | 5/2009 | Chen | G06K 19/07718 156/184 |
| 2016/0251102 | A1 * | 9/2016 | Landolt | B65B 31/024 700/114 |

FOREIGN PATENT DOCUMENTS

| | | |
|---|---|---|
| JP | 2014-006468 A | 1/2014 |
| KR | 10-2004-0094905 A | 11/2004 |
| KR | 10-2007-0029469 A | 3/2007 |
| KR | 10-2012-0029633 A | 3/2012 |

OTHER PUBLICATIONS

Notice of Reasons for Rejection, Korean Patent Application No. 10-2017-0053886, dated Jun. 27, 2018.
International Search Report in corresponding PCT/KR2017/004461, dated Jul. 20, 2017.

* cited by examiner

SEALING DEVICE FOR SECURING PACKAGING MATERIAL

CROSS-REFERENCE TO RELATED APPLICATIONS

This is a continuation application of International Application No. PCT/KR2017/004461 filed on Apr. 26, 2017, which claims priority to Korean Application No. 10-2016-0051594 filed on Apr. 27, 2016. The applications are incorporated herein by reference.

TECHNICAL FIELD

The present invention relates to an apparatus for securely sealing a packaging.

RELATED ART

RFID tag recognition technology is being widely used in the fields of production management, warehouse management, consignment management, and sales management. In addition, thanks to advances in tag recognition and information technology, terminals having mounted or connected RFID readers are being used in conjunction with tags to not only provide product information from web pages but also ascertain whether or not a product is genuine. In globally renowned malls, renowned fashion designers, renowned shoemakers, distilleries, pharmaceutical companies, food companies, and the like, which are currently manufacturing or distributing consumer products, research is under way with regard to the convenience and excellence obtained by introducing RFID technology to products, with the aims of increasing the effectiveness of product management and increasing reliability for the consumer, and it is anticipated that there will be competitive movements toward attaching RFID tags onto all products when the RFID mobile terminal is popularized. However, a packaging container equipped with an information tag according to the related art generally involves an RFID label attached to the body of the product's packaging container or an RFID tag provided in the container lid, for product management.

The plastic packaging is mostly being used as containers for holding food products such as vegetables. When a food product is placed into such a food-product plastic packaging, it is either left unsealed or sealed with a simple knot, so that there is a risk of the contents of the plastic packaging leaking out.

SUMMARY

An aspect of the present invention is to provide an apparatus for securely sealing a packaging, where a plastic packaging for holding a product is sealed using a sealing tape to which an RFID tag is attached such that the RFID tag attached to the sealing tape is destroyed when the plastic packaging is opened at the sealing tape.

One aspect of the present invention discloses an apparatus for securely sealing a packaging using RFID.

An embodiment of the present invention provides an apparatus for securely sealing a packaging that includes: a tape supply reel that supplies a sealing tape to which multiple RFID tags are attached; an RFID writer that records price information associated with a product contained in a plastic packaging onto a first RFID tag, from among the multiple RFID tags, according to a control of a control unit; and a sealing unit that seals the opening part of the plastic packaging with the sealing tape, where the sealing unit attaches the first RFID tag on which the price information has been recorded onto an adhesion surface of the sealing tape by way of an adhesive, and the first RFID tag is structured to be broken when separated from the adhesion surface.

The RFID writer can record the price information onto the first RFID tag when information on at least one of an item type, weight, number, and price of the product is received from a data generation unit.

The data generation unit can be a scale that is capable of measuring weight and capable of near-field communication.

The control unit can compute the price information for the product by referencing a memory when information on at least one of the item type, weight, and number of the product is received from the data generation unit.

The control unit can communicate with a server and provide the control for recording the price information for the product onto the first RFID tag when information on at least one of the item type, weight, and number of the product is received from the data generation unit.

The control unit can control the driving of the tape supply reel such that first RFID tag is transported to a preconfigured position.

The sealing unit can attach the first RFID tag such that the first RFID tag joined to one end on one side of a one-time application length of the sealing tape is attached to the other end on the one side of the one-time application length of the sealing tape.

The sealing tape can include a first surface on which an adhesive is applied, so that multiple RFID tags may be attached, and a second surface on which there is no adhesive applied and thus does not have the RFID tags attached thereto.

An adhesive can be applied to the first surface and to the surfaces of the multiple number of RFID tags, and the adhesion strength of the adhesive can be within a range such that the multiple RFID tags may be attached to the adhesion surface for sealing the opening part of the plastic packaging and may be broken during the detaching process but may not be broken during separation from the second surface when being unwound from the tape supply reel.

It is possible to have an adhesive applied to the multiple RFID tags and not have an adhesive applied to the adhesion surface.

The sealing unit can include a first bar and a second bar, with the second bar arranged facing the first bar and placed in tight contact with the first bar during the sealing of the opening part of the plastic packaging.

The first bar can be positioned above the second bar and can be moved down toward the second bar during the sealing of the opening part of the plastic packaging.

The first RFID tag can be positioned on the side of the second bar immediately before the sealing of the opening part of the plastic packaging.

On the first bar, a pressing part can be formed, which may be configured to press the adhesion surface positioned at the first bar and the first RFID tag together for attaching after the first bar is moved down to the second bar.

The pressing part can be movable along an up/down direction within an inside area of the first bar and can be installed to return to its previous state after being moved downward.

The sealing unit can further include: a side bar, which may be coupled to an end of the second bar and the first bar and in which a guide hole may be formed to accommodate an oscillating motion of the second bar, with the side bar configured to guide the sealing tape supplied through the second bar such that the sealing tape is supplied to the first bar; and a guard rod coupled to one side of the second bar and the first bar, where the first RFID tag can be positioned between the side bar and the guide rod during the sealing of the opening part of the plastic packaging.

The sealing tape can include an RFID tag section and an adhesion surface section, where a front end of the sealing tape can have a first adhesion surface section, a second adhesion surface section, a first RFID tag section, and a second RFID tag section arranged sequentially.

During an initial supplying, the first adhesion surface section can be positioned at the first bar, the second adhesion surface section can be positioned at the side bar, and the first RFID tag section can be positioned at the second bar.

An embodiment of the present invention provides an apparatus for securely sealing a packaging that includes a processor and a memory connected to the processor, where the memory stores program instructions executable by the processor to provide control such that: a tape supply reel supplies a sealing tape, to which a multiple number of RFID tags are joined, towards an RFID writer; the RFID writer records price information associated with a product contained in a plastic packaging onto a first RFID tag from among the multiple RFID tags; and a sealing unit seals the opening part of the plastic packaging with the sealing tape, and where the sealing unit attaches an RFID tag on which the price information has been recorded onto an adhesion surface by way of an adhesive, and the RFID tag is structured to be broken when separated from the adhesion surface.

An apparatus for securely sealing a packaging according to an embodiment of the present invention may include a tape supply reel that supplies a sealing tape to which RFID tags are joined and a sealing unit that seals the opening part of the plastic packaging holding the product with the sealing tape, where the sealing unit may attach the RFID tags such that an RFID tag joined to one end of a one-time application length of the sealing tape is attached to an adhesive formed on the other end of the one-time application length of the sealing tape, and the RFID tag may have a structure that is broken by the strength of the adhesion to the other end during the process of the sealing tape sealing the plastic packaging being detached.

The RFID tag may be joined to one end of a one-time application length of the sealing tape, and as the sealing tape is wound around the edge of the opening part and attached by the adhesive applied on the sealing tape, the RFID tag may be attached by the adhesive to the other end of the one-time application length of the sealing tape.

The apparatus may further include an RFID writer provided at the sealing unit and a controller that obtains product information for the product and transmits the product information to the RFID writer.

The sealing unit may include a first bar; a second bar that is arranged facing the first bar to be placed in tight contact with the first bar, or be separated again after being placed in tight contact with the first bar, by way of an oscillating motion; and a tape guide part that is connected with one end of each of the first bar and the second bar and configured to guide the sealing tape supplied to the first bar such that the sealing tape is guided toward the second bar.

The RFID writer may be embedded in at least one of the first bar and the second bar and may write the product information on the RFID tag when the sealing tape supplied to the sealing unit is placed over the first bar, the tape guide part, and the second bar.

The tape guide part may be formed from an elastic material that can be deformed by the oscillating motion of the second bar, so as to allow the second bar to undergo an oscillating motion.

The sealing tape may have a cutting line formed in constant intervals tantamount to a preset one-time application length, and each one-time application length of sealing tape may have adhesive non-application areas formed at both ends and an adhesive application area formed in the areas excluding the adhesive non-application areas.

The sealing tape may have sensing holes formed in constant intervals along its lengthwise direction.

An extension area may be formed along the lengthwise direction on at least one of the two sides of the sealing tape, and the sensing holes may be formed in the extension area.

The apparatus may further include a sensor for detecting the sensing holes, so as to detect the position of the sealing tape by using the sensing holes.

The apparatus may further include a tape supply roller that supplies the sealing tape wound on the tape supply reel to the sealing unit, where the tape supply roller includes at least one protrusion parts that are inserted through the sensing holes, so that as the tap supply roller is rotated, the sealing tape carried on the protrusion parts by the sensing holes may be supplied to the sealing unit, while at the same time, the position of the sealing tape may be detected based on the number of rotations of the tape supply roller.

The RFID tag may be joined to one end of the adhesive application area during the manufacture of the sealing tape, and when the opening part of the plastic packaging is sealed with the sealing tape of a one-time application length, the one-time application length of sealing tape may be wound around the edge of the opening part and attached by the adhesive applied, while the RFID tag may be placed in tight contact with both ends of the adhesive application area to be joined by the adhesive.

When the opening part of the plastic packaging is sealed with the one-time application length of sealing tape, a pair of opener ends may be formed by the adhesive non-application areas, allowing the user to grip the opener ends, detach the joined sealing tape, and thus open the sealed plastic packaging.

The RFID tag may be divided into two layers by a breaking line, with an RFID chip embedded in a first layer and an RFID antenna embedded in a second layer, and the breaking line may be formed relatively weaker compared to other portions of the RFID tag in order that the first layer and the second layer may be readily separated.

The apparatus may further include a protective film retrieval reel that winds and collects the protective film separated from the sealing tape.

The apparatus may further include a pair of packaging clampers that clamp the opening part of the plastic packaging before the sealing tape is joined to the plastic packaging.

A packaging clamper may include an insertion part, through which the plastic packaging may be inserted, formed in a size corresponding to that of the plastic packaging, and a pressure part that performs an oscillating motion along the lengthwise direction may be mounted inside the insertion part.

A pair of packaging clampers may be arranged on both sides of the sealing unit such that the direction in which the plastic packaging is inserted agrees with that of the sealing unit.

After the plastic packaging is inserted through the insertion part of the first packaging clamper, a position between the first bar and the second bar of the sealing unit, and the insertion part of the second packaging clamper in said order, the pressure part may push and clamp the opening part of the plastic packaging while moving from one end to the other end within the insertion part.

The sealing tape may be of a hard material. The apparatus may further include a guide roller, which may guide the sealing tape moving from the first bar to the second bar while between the first bar and the second bar, and a used tape retrieval reel that winds and collects the used sealing tape, where the tap supply reel, the guide roller, and the used tape retrieval reel may be controlled to rotate such that the sealing tape may be supplied to the sealing unit while maintaining a constant tension.

An apparatus for securely sealing a packaging according to an embodiment of the present invention can seal a plastic packaging for a product by using a sealing tape having an attached RFID tag and can have the RFID tag attached to the sealing tape destroyed when the plastic packaging is opened by the sealing tape, whereby redundant product authentication can be avoided, and the contents can be prevented from leaking due to user opening the package arbitrarily. Furthermore, the RFID tag can be applied also to the packaging of agricultural, dairy, marine products that are purveyed in units of weight or in numbers on site, whereby it becomes possible to calculate the properties of a product non-stop by using an RFID reader even while the product is still in the shopping cart.

DETAILED DESCRIPTION

In the present specification, an expression used in the singular encompasses the expression of the plural, unless it has a clearly different meaning in the context. In the present specification, it is to be understood that descriptions such as being "composed of" or "including", etc., are not to be interpreted as meaning that the various components or the various steps disclosed in the specification must all necessarily be included, but rather should be interpreted as meaning that some of the components or some of the steps may not be included or additional components or steps may further be included. A term such as "unit", "module", etc., in the specification refers to a unit component by which at least one function or action is processed, where such unit component can be implemented as hardware or software or as a combination of hardware and software.

Various embodiments of the present invention are described below in more detail with reference to the accompanying drawings.

Figure 1:
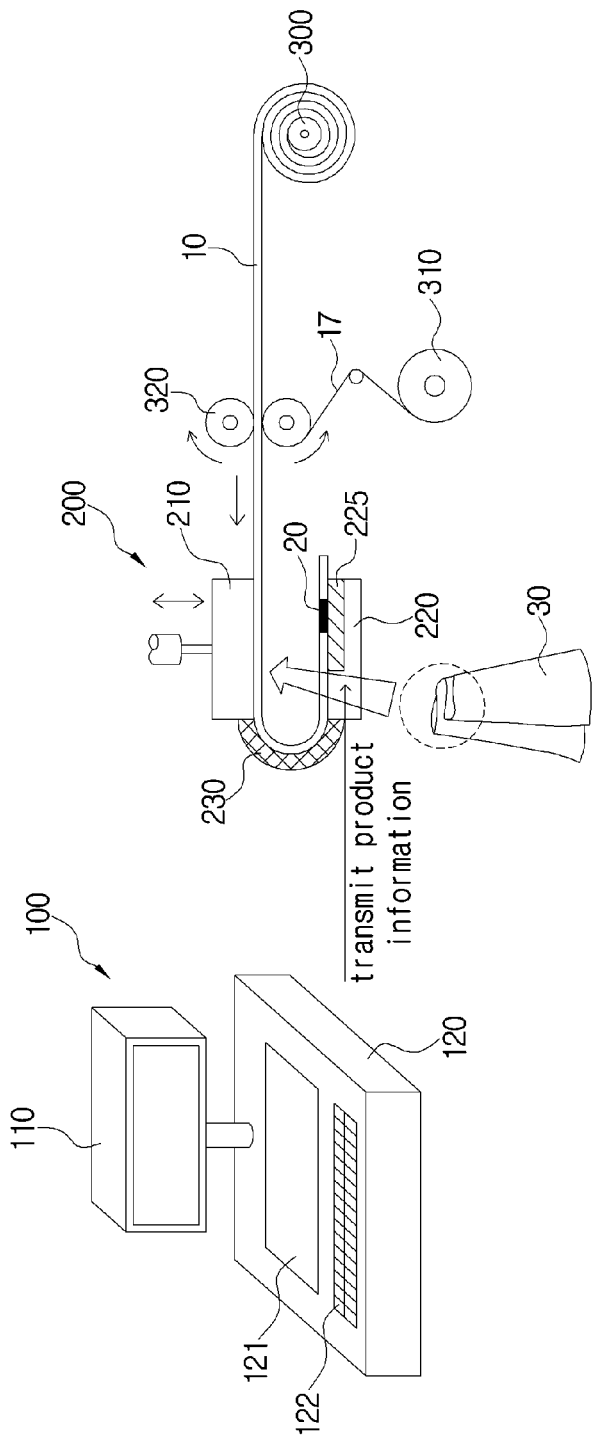
FIG. 1 schematically illustrates the composition of an apparatus for securely sealing a packaging according to an embodiment of the present invention.
Figure 2:
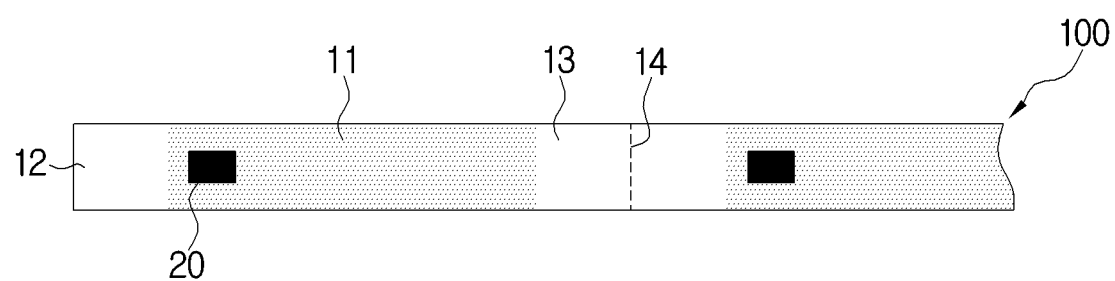
FIG. 2 illustrates a sealing tape according to an embodiment of the present invention.

FIG. 1 schematically illustrates the composition of an apparatus for securely sealing a packaging according to an embodiment of the present invention, and FIG. 2 illustrates a sealing tape according to an embodiment of the present invention.

Referring to FIG. 1, an apparatus for securely sealing a packaging may include a data generation unit 100, a sealing unit 200, an RFID writer 225, a tape supply reel 300, a protective tape retrieval reel 310, and a tape supply roller 320.

Although it is not shown in the drawings, the apparatus for securely sealing a packaging may include a control unit, where the control unit may control the operations of other components (e.g. the sealing unit 200, RFID writer 225, tape supply reel 300, protective tape retrieval reel 310, and tape supply roller 320) of the apparatus for securely sealing a packaging.

In particular, the data generation unit 100 may measure the weight of a product and transmit product information, including the measured weight information, to the RFID writer 225 side.

Preferably, the data generation unit 100 can be an electronic scale that is capable of measuring weight and capable of inputting the item type or number.

Also, the data generation unit 100 can transmit at least one of item type, weight, and number information to the RFID writer 225 side over a near-field network.

Here, a near-field network can include WiFi and Bluetooth. However, the RFID writer 225 can also be connected with the data generation unit 100 over the Internet or a mobile communication network.

Referring to FIG. 1, the data generation unit 100 can be composed of a monitor 110 and a main body 120, while the main body 120 can be provided with a scale 121 and a user input part 122. Thus, when a plastic packaging 30 containing a product is placed on the scale 121 on the main body 120, the data generation unit 100 can output the weight value measured with the scale 121 on the monitor 110. The user can directly input the product information for the corresponding product by using the user input part 122 or load the product information of the corresponding product from a memory (not shown) included in the data generation unit 100 or from a connected database (not shown). This product information can be transmitted to the RFID writer 225 according to an RFID writing command input made by the user.

A data receiver unit can additionally be provided between the data generation unit 100 and the RFID writer 225, and when at least one of the item type, weight, and number information of the product is received from the data generation unit 100, the RFID writer 225 can follow the control of the control unit to compute the price information for the product by referencing the memory or compute the price information by communicating with a server.

In cases where a memory or a server is used, the price information can be computed even if the data generation unit 100 does not transmit the price information directly.

Also, a control unit according to this embodiment can control the driving of the tape supply reel 300.

The control unit can control the driving of the tape supply reel 300 such that the RFID tag 20, onto which the price information is to be recorded at a particular time, may be disposed at a preset position.

The control unit may control the driving of the tape supply reel 300 such that, after the opening part has been sealed for one plastic packaging, the RFID tag that will be used next is arranged at a particular position, preferably a position corresponding with the RFID writer 225.

The sealing unit 200 can include a first bar 210, a second bar 220 arranged facing the first bar 210, and a tape guide part 230. Here, an RFID writer 225 may be embedded in the first bar 210 or the second bar 220. In the descriptions below, the first bar 210 and the second bar 220 are referred to as an upper bar 210 and a lower bar 220, as illustrated in FIG. 1, for the sake of easier understanding and explanation.

In one example, referring to FIG. 1, the sealing unit 200 can be structured with the lower bar 220 in a fixed state and with the upper bar 210, positioned above the lower bar 220, moving in an up/down motion to be put in tight contact with the lower bar 220 or be separated from the lower bar 220 after being placed in tight contact. The tape guide part 230 can be connected with one end of each of the upper bar 210 and lower bar 220, to guide the sealing tape 10, which may be supplied to the upper bar 210, to the lower bar 220. Also, the tape guide part 230 can be formed from an elastic material that can be deformed by the up/down motion of the upper bar 210 so as to permit the up/down motion of the upper bar 210. Here, the upper bar 210 and the lower bar 220 can also be provided with guide grooves (not shown) for guiding the supplied sealing tape 10, similarly to the tape guide part 230.

The RFID writer 225 may preferably be positioned at the lower bar 220 side and, when the sealing tape 10 is placed over the upper bar 210, tape guide part 230, and lower bar 220, may write the product information received from the data generation unit 100 onto the RFID tag 20 of the sealing tape 10.

The RFID writer 225 may record the price information associated with the product contained in the plastic packaging onto one of the multiple RFID tags attached to the sealing tape 10 in accordance with the control of the control unit.

FIG. 1 illustrates an example in which the RFID tag 20 is positioned at the front end of the sealing tape 10 and the RFID tag 20 is positioned on the lower bar 20, as illustrated in FIG. 1.

However, without being limited to the above, the positions of the upper bar 210, lower bar 220, and RFID tag 20 can be changed in various ways, some examples of which will be described later on.

Below, a sealing tape 10 according to an embodiment of the present invention is described in further detail, with reference to FIG. 2.

Referring to FIG. 2, the sealing tape 10 may be provided with cutting lines 14 formed in constant intervals tantamount to a preset one-time application length. For example, the cutting line 14 can be formed by punching holes in certain intervals, to allow easier cutting of the sealing tape 10, or simply by marking, to indicate where the sealing tape 10 can be cut with a separate cutting device (not shown). Moreover, in cases where a separate cutting device (not shown) is provided, the cutting line may not even be formed on the sealing tape 10 at all. In such cases, the cutting line 14 illustrated in FIG. 2 may not actually be formed or marked on the sealing tape 10 and may merely represent the positions that will be cut by a cutting device.

The sealing tape 10 can be divided into an adhesive application area 11 and an adhesive non-application area 12, 13. Here, the adhesive non-application area 12, 13 can be formed, as illustrated in FIG. 2, on both sides of an adhesive application area 11. That is, the adhesive non-application area 12, 13 can be formed at a front end and a rear end of a one-time application length of sealing tape 10. This is so that, after the one-time application length of sealing tape 10 is joined to the plastic packaging 30 containing the product, the user may use the adhesive non-application area 12, 13 for opening the plastic packaging 30, enabling the user to more easily open the plastic packaging 30 using sealing tape 10.

The RFID tag 20 may be attached to the adhesive application area 11 of the sealing tape 10.

For example, as illustrated in FIG. 2, the RFID tag 20 can be attached to one end of the adhesive application area 11. Thus, when the opening part of the plastic packaging 30 is sealed with the one-time application length of the sealing tape 10, the one-time application length of sealing tape 10 may be wound around the edge of the opening part of the plastic packaging 30 and attached with an adhesive, and at the same time, the two ends of the adhesive application area 11 may be placed in tight contact and joined with the adhesive. Also, the RFID tag 20 can be secured firmly on the sealing tape 10 of a one-time application length with the RFID tag 20 positioned between the two ends of the adhesive application area 11 joined by the adhesive. Here, the opening part of the plastic packaging 30 can be folded twice or more by the user and inserted between the upper bar 210 and lower bar 220, after which the upper bar 210 can be moved down for tight contact with the lower bar 220, resulting in the sealing tape 10 placed over the upper bar 210, tape guide part 230, and lower bar 220 being pushed in tight contact with itself and the edge of the opening part of the plastic packaging 30 to be joined by the adhesive.

The tape supply reel 300 may have the sealing tape 10 for supplying to the sealing unit 200 wound thereon, and the tape supply roller 320 may supply the sealing tape 10 wound around the tape supply reel 300 to the sealing unit 200. That is, the sealing tape 10 can be supplied to the sealing unit 200 as the tape supply reel 300 and the tape supply roller 320 rotate.

The protective tape retrieval reel 310 may wind and collect the protective film 17 separated from the sealing tape 10. Here, the protective film 17, in order to prevent the sealing tape 10 from sticking to itself due to the adhesive applied on the surface of the sealing tape 10 when the sealing tape 10 is wound around the tape supply reel 300, may be joined with the sealing tape 10 beforehand along the surface on which the adhesive is applied and may have the same size as that of the sealing tape 10. As the protective tape retrieval reel 310 is rotated in a speed corresponding to the supply speed of the sealing tape 10, the protective film 17 can be separated from the sealing tape 10 at the tape supply roller 320, to be easily removed from the supplied sealing tape 10.

Of course, the sealing tape 10 can also be wound around the tape supply reel 300 without the protective film 17. The sealing tape 10 can include a first surface, on which the RFID tags 20 may be attached and on which an adhesive may be applied, and a second surface on the opposite side where the adhesive is not applied. Even if the protective film 17 is not present, the roll wound around the tape supply reel 300 can have the first surface, on which the RFID tags 20 are attached, contacting the smooth second surface, making it unnecessary to use a protective film 17. In such cases, the protective tape retrieval reel 310 may not be needed.

Figure 3:
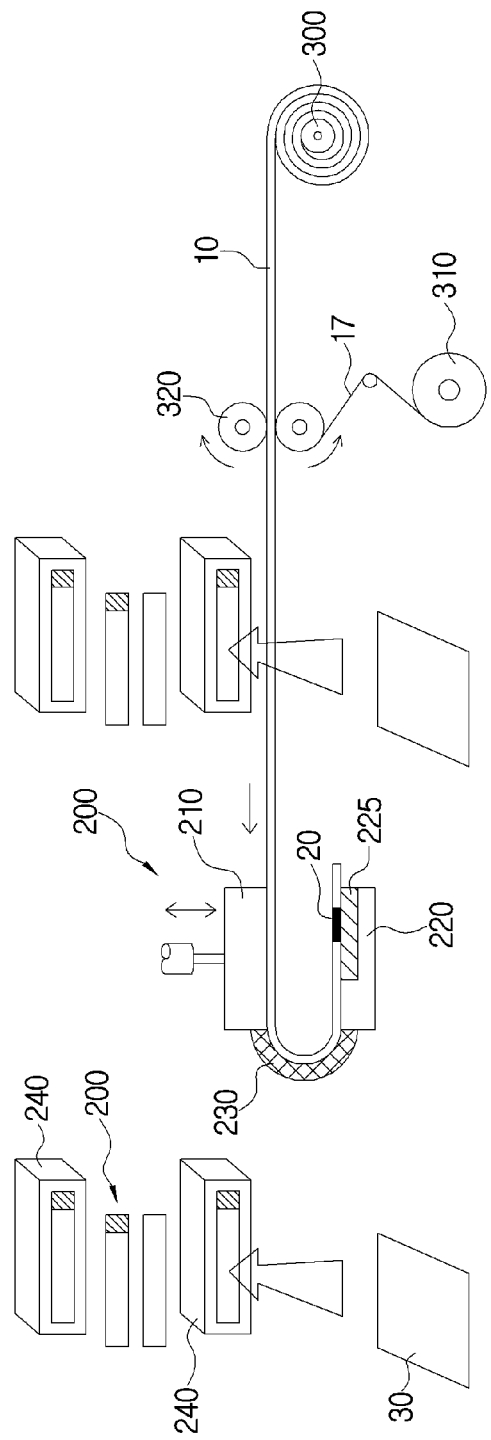
FIG. 3 schematically illustrates the composition of an apparatus for securely sealing a packaging according to another embodiment of the present invention.
Figure 4:
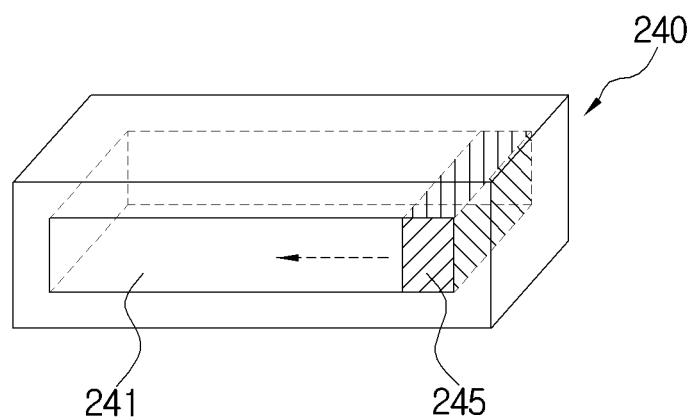
FIG. 4 illustrates a packaging clamper in the apparatus for securely sealing a packaging shown in FIG. 3.
Figure 5:
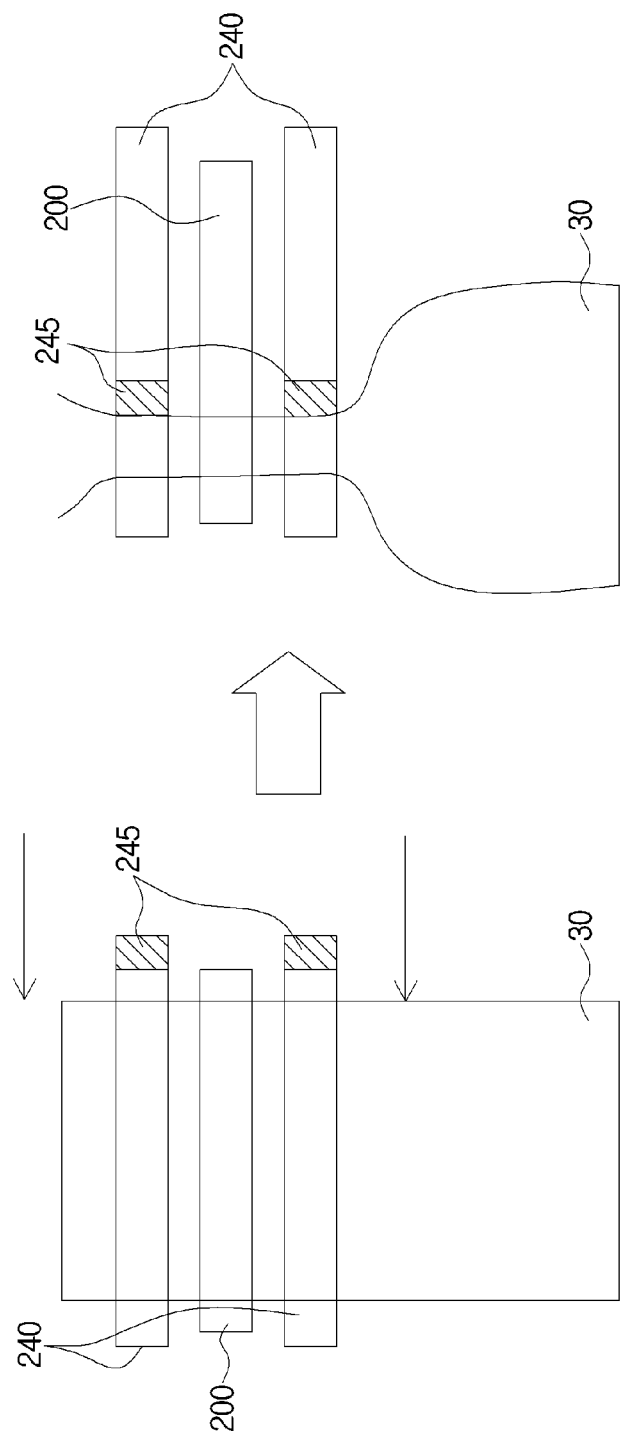
FIG. 5 illustrates an operation of the packaging clamper.

FIG. 3 schematically illustrates the composition of an apparatus for securely sealing a packaging according to another embodiment of the present invention, FIG. 4 illustrates a packaging clamper in the apparatus for securely sealing a packaging shown in FIG. 3, and FIG. 5 illustrates an operation of the packaging clamper.

In the descriptions below, certain descriptions may be omitted for components that are substantially the same as those of the apparatus for securely sealing a packaging according to an embodiment of the present invention described above with reference to FIG. 1.

Referring to FIG. 3, an apparatus for securely sealing a packaging according to another embodiment of the present invention can further include a pair of packaging clampers 240.

As described above, the apparatus for securely sealing a packaging according to an embodiment of the present invention illustrated in FIG. 1 requires a user folding the opening part of the plastic packaging 30 two or more times and inserting the opening part between the upper bar 210 and lower bar 220, after which the sealing tape 10 can be placed in tight contact with itself and with the edge of the opening part of the plastic packaging 30 to be joined by the adhesive. The reason for this is because, if the sealing tape 10 is simply attached to the edge of the opening part of the plastic packaging 30 without folding the opening part of the plastic packaging 30, then the opening part of the plastic packaging 30 would not be sealed.

Therefore, an apparatus for securely sealing a packaging according to another embodiment of the present invention may clamp the opening part of the plastic packaging 30 by using a pair of packaging clampers 240 and then join the sealing tape 10 in tight contact with the opening part of the plastic packaging 30.

Referring to FIG. 4, a packaging clamper 240 may include an insertion part 241, through which the plastic packaging 30 may be inserted, formed in a size corresponding to that of the plastic packaging 30. Inside the insertion part 241, a pressure part 245 may be mounted, which may move in an oscillating motion along the lengthwise direction. The packaging clampers 240 may be arranged as a pair on both sides of the sealing unit 200 in accordance with the insertion direction of the plastic packaging 30 such that the insertion direction for the sealing unit 200 agrees with the insertion direction of the plastic packaging 30.

That is, referring to FIG. 5, the plastic packaging 30 can be inserted through the insertion part 241 of the first packaging clamper 240, the position between the upper bar 210 and the lower bar 220 of the sealing unit 200, and the insertion part 241 of the second packaging clamper 240 in said order. Afterwards, the pressure part 245 of each packaging clamper 240 may move from one end to the other end inside the insertion part 241 to push and clamp the opening part of the plastic packaging 30. As the sealing tape 10 is joined to the plastic packaging 30 while the opening part of the plastic packaging 30 is clamped in this manner, the opening part of the plastic packaging 30 can be firmly sealed by the sealing tape 10.

Figure 6:
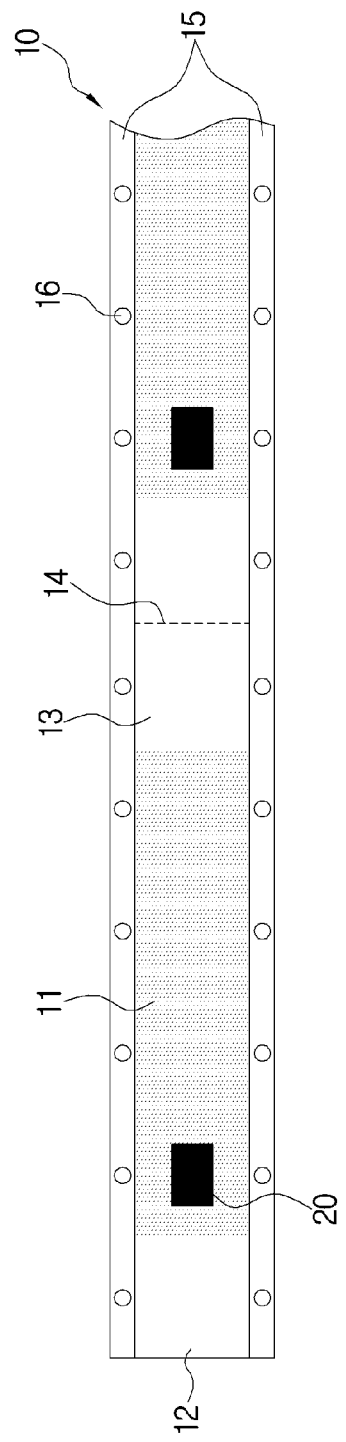
FIG. 6 and FIG. 7 illustrate sealing tapes according to other embodiments of the present invention.
Figure 7:
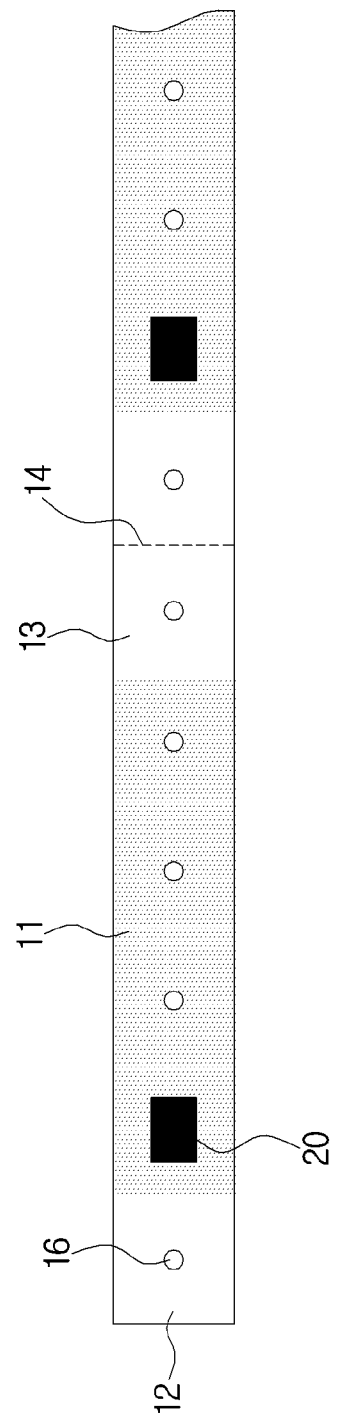

FIG. 6 and FIG. 7 illustrate sealing tapes according to other embodiments of the present invention.

Referring to FIG. 6 and FIG. 7, a sealing tape 10 according to other embodiments of the present invention can have sensing holes 16 formed in constant intervals along the lengthwise direction. These sensing holes 16 can be used for arranging the sealing tape 10 at a suitable position on the sealing unit 200, when the control unit (not shown) controls the rotations of the tape supply reel 300, protective tape retrieval reel 310, and tape supply roller 320 to control the supply of the sealing tape 10 to the sealing unit 200.

For example, the sealing tape 10 can additionally include extension areas 15 formed on both sides along the lengthwise direction, as in FIG. 6, where the sensing holes 16 can be formed in the extension areas 15. Here, it may be preferable not to have the adhesive applied on the extension areas 15. The sensing holes 16 can be formed to allow a distinction of the positions of the adhesive non-application area 12, 13, the adhesive application area 11, and the RFID tag 20, etc. That is, as illustrated in FIG. 6, the first sensing hole 16 can demark the position of the first adhesive non-application area 12, the second sensing hole 16 can demark the position of the RFID tag 20, and the sixth sensing hole 16 can demark the position of the second adhesive non-application area 13 and at the same time indicate the end position of the one-time application length.

While the extension area 15 for a sealing tape 10 can be formed on both sides along the lengthwise direction of the sealing tape 10 as illustrated in FIG. 6, it can also be formed on at least one of the two sides along the lengthwise direction of the sealing tape 10.

For example, the sensing holes 16 can be formed in certain intervals on the sealing tape 10 as in FIG. 7, without the extension areas 15 illustrated in FIG. 6, such that the areas may be differentiated. Of course, as in the example illustrated in FIG. 7, it is possible to omit the sensing holes 6 at the positions of the RFID tags 20, because the RFID tags 20 may be present there.

In order to sense this type of sensing holes 16, the sealing unit 200 can be equipped with a sensor (not shown) for detecting such sensing holes 16. For example, a sensor for detecting the sensing holes 16 can be mounted at a position on the upper bar 210 where the sealing tape 10 first comes into contact.

In another embodiment, the sensing holes 16 can also be used for the purpose of transporting the sealing tape 10, as well as for detecting the position of the sealing tape 10. For example, on the portions that contact the sensing holes 16, the tape supply roller 320 can include at least one protrusion parts (not shown) which may be inserted through the sensing holes 16. Thus, the sealing tape 10 carried by the sensing holes 16 on the protrusion parts can be supplied to the sealing unit 200 as the tape supply roller 320 is rotated. Accordingly, the position of the sealing tape 10 can be detected from the number of rotations of the tape supply roller 320.

Using this, the control unit can control the supply of the sealing tape 10 in such a way that a one-time application length of sealing tape 10 is placed correctly over the upper bar 210, tape guide part 230, and lower bar 220.

While the descriptions above illustrate a method of controlling the position of the sealing tape 10 using sensing holes with reference to FIG. 6 and FIG. 7, various position control techniques can be applied. For example, an optical sensor may be mounted on the lower bar 220, and the upper surface of the lower bar 220 corresponding to the point where the optical sensor is mounted can be formed with an optically transmissive material. Here, light emitted from the optical sensor in a certain cycle may pass through the optically transmissive material of the upper surface of the lower bar 220 and may be reflected off the sealing tape 10 to return to the optical sensor. Therefore, by measuring the amount of light entering the optical sensor, it is possible to identify the position of the RFID tag 20 attached to the sealing tape 10. That is, the amount of light reflected at the position where the RFID tag 20 is attached may be smaller than the amount of light reflected at other portions of the sealing tape 10, and this can be used by the optical sensor to identify the position of the RFID tag 20 attached on the sealing tape 10. The control unit can provide control such that the sealing tape 10 is arranged at the correct position of the lower bar 220 based on the information inputted from the optical sensor.

Figure 8:
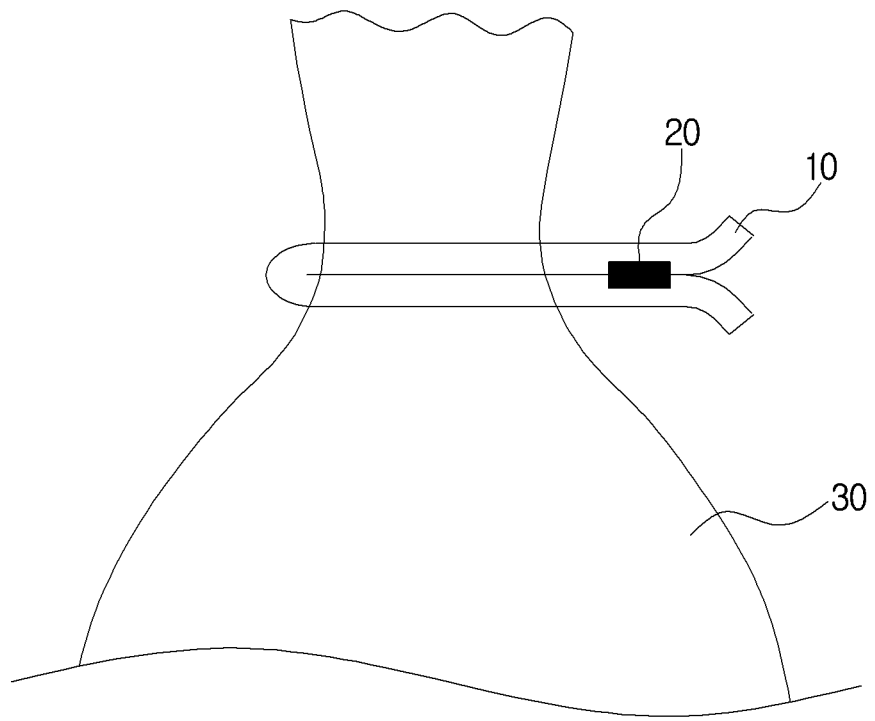
FIG. 8 is a conceptual diagram illustrating a sealing tape according to an embodiment of the present invention as joined to a plastic packaging.
Figure 9:
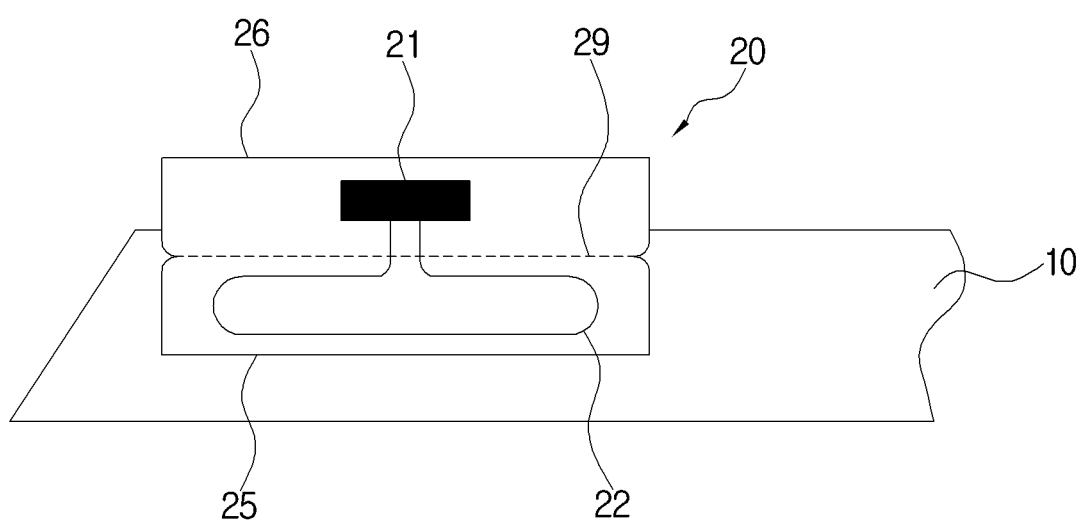
FIG. 9 illustrates an RFID tag according to an embodiment of the present invention.
Figure 10:
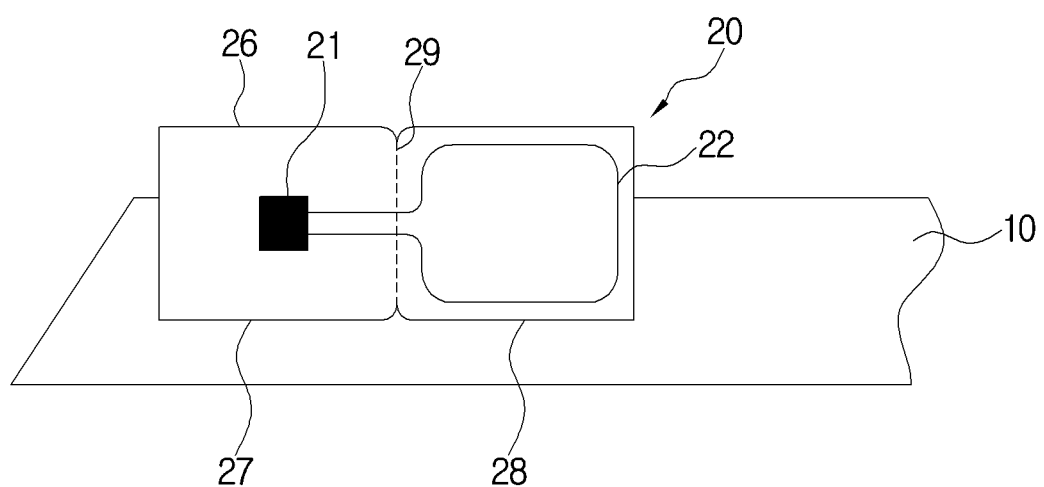
FIG. 10 illustrates an RFID tag according to another embodiment of the present invention.

FIG. 8 is a conceptual diagram illustrating a sealing tape according to an embodiment of the present invention as coupled to a plastic packaging, FIG. 9 illustrates an RFID tag according to an embodiment of the present invention, and FIG. 10 illustrates an RFID tag according to another embodiment of the present invention.

As illustrated in FIG. 8, with the opening part of the plastic packaging 30 in a folded or clamped state, a one-time application length of sealing tape 10 can be wound around the edge of the opening part of the plastic packaging 30 and attached by the adhesive, while at the same time, the two ends of the adhesive application area 11 can be placed in tight contact and joined by the adhesive. Here, the RFID tag 20 can be positioned between the two ends of the adhesive application area 11 joined by the adhesive, so that both surfaces of the RFID tag 20 may be firmly joined to the sealing tape 10. Also, at one end of the sealing tape 10 joined by the adhesive application area 11, a pair of opener ends may be formed by the adhesive non-application areas 12, 13. A user can, for example, hold the pair of opener ends with both hands and detach the joined sealing tape 10 to open the plastic packaging 30 that was sealed with the sealing tape 10.

The RFID tag 20 can be given a readily breakable structure such that the RFID tag 20 is damaged during this process of opening the plastic packaging 30.

That is, referring to FIG. 9, an RFID tag 20 according to an embodiment of the present invention may be divided into two layers by a breaking line 29, with an RFID chip 21 embedded in a first layer and an RFID antenna 22 embedded in a second layer. The breaking line 29 can be formed relatively weaker than other portions of the RFID tag 20 such that the first layer and second layer are easily separable. For example, one surface 25 of the second layer can be firmly joined to the sealing tape 10 during the manufacture of the sealing tape 10, and afterwards, one surface of the first layer can be attached and joined to one end of the adhesive application area 11 of the sealing tape 10. When the joined sealing tape 10 is detached, the joined sealing tape 10 may be detached, and concurrently, the RFID tag 20 can be cut along the breaking line 29 and divided into the first layer and second layer due to the force of the sealing tape 10 being detached. As a result, the RFID chip 21 and the RFID antenna 22 present in the first layer and the second layer, respectively, may be separated, whereby the RFID tag 20 can be damaged and no longer function.

Also, referring to FIG. 10, an RFID tag 20 according to another embodiment of the present invention can have the first layer and second layer arranged left and right instead of up and down as in the example shown in FIG. 9. In this case, one surface 28 of the second layer can be firmly joined to the sealing tape 10 during the manufacture of the sealing tape 10, while the one surface 27 of the first layer may not be joined. Afterwards, the other surface 26 of the first layer can be attached and joined to one end of the adhesive application area 11 of the sealing tape 10. Thus, when the joined sealing tape 10 is detached, the joined sealing tape 10 can be detached, and concurrently, the RFID tag 20 can be cut along the breaking line 29 and separated into the first layer and second layer by the force of the sealing tape 10 being detached. Of course, the other surface of the second layer can also be attached to one end of the adhesive application area 11 of the sealing tape 10, and the sealing tape 10 can be manufactured such that the bonding force here is not as strong as the bonding force joining the one surface 28 of the second layer.

While the descriptions above illustrate the RFID tag 20 being attached to an adhesion surface having an adhesive applied thereto when the opening part of the plastic packaging is sealed, the present invention is not limited thus, and it would also be possible to apply the adhesive to the surface of the RFID tag 20 and have this portion attached to an adhesion surface on which there is no adhesive applied beforehand.

In this case also, the process by which the RFID tag 20 is broken during the re-opening process of the plastic packaging 30 can be the same.

Figure 11:
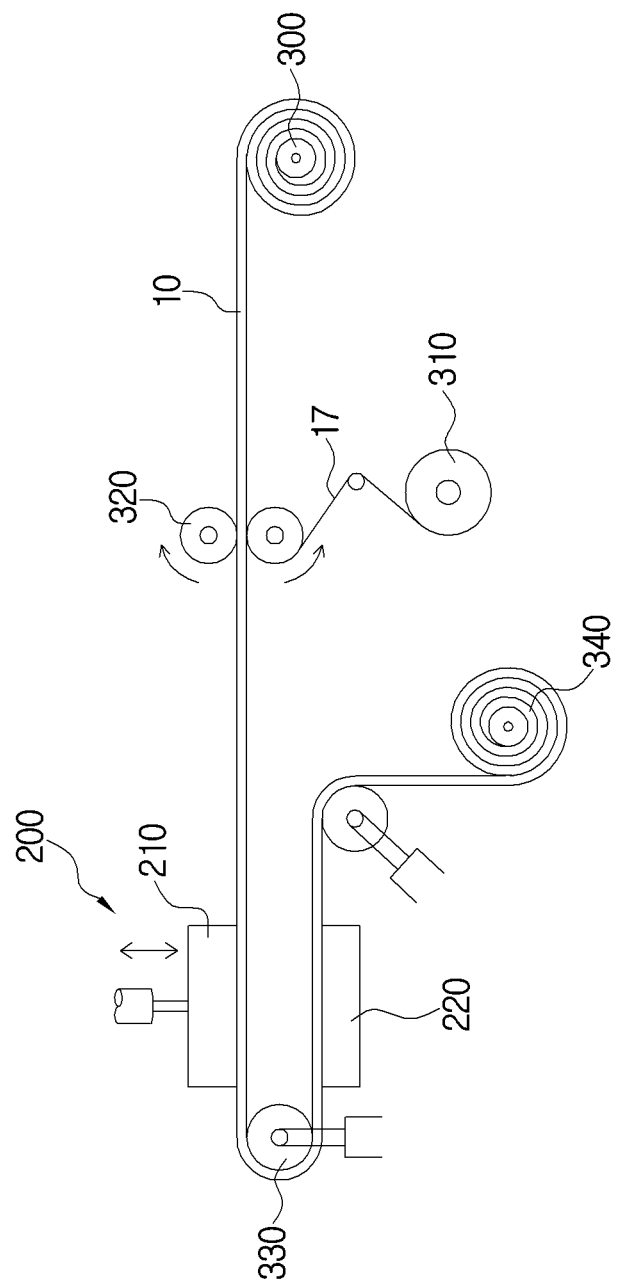
FIG. 11 schematically illustrates the composition of an apparatus for securely sealing a packaging according to still another embodiment of the present invention.
Figure 12:
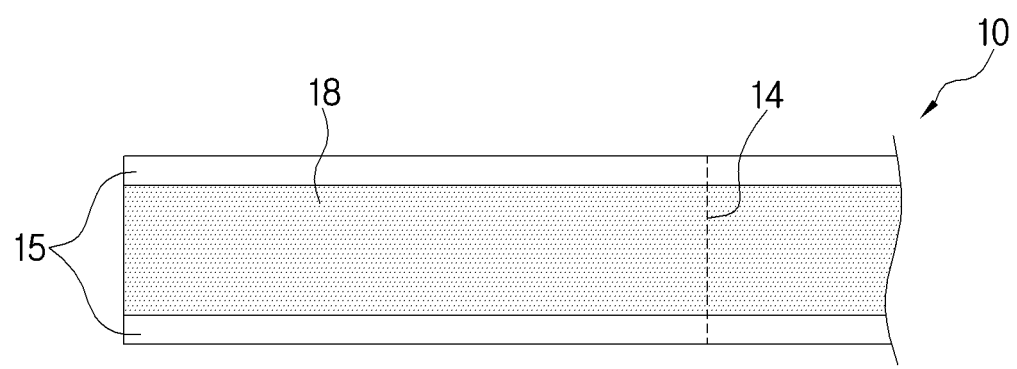
FIG. 12 illustrates a sealing tape utilized in the apparatus for securely sealing a packaging shown in FIG. 11.

FIG. 11 schematically illustrates the composition of an apparatus for securely sealing a packaging according to still another embodiment of the present invention, and FIG. 12 illustrates a sealing tape utilized in the apparatus for securely sealing a packaging shown in FIG. 11.

The sealing tape 10 applied to an apparatus for securely sealing a packaging described with reference to FIG. 1 to FIG. 10 above may be supplied by forcibly pushing into the sealing unit 200 and thus may be made of a hard material that allows such forcible pushing.

If the sealing tape 10 is not made of a hard material, the sealing tape 10 cannot be supplied by a method of forcible pushing into the sealing unit 200.

Thus, referring to FIG. 11, an apparatus for securely sealing a packaging according to yet another embodiment of the present invention can include a guide roller 330, which may guide the sealing tape 10 moving from the upper bar 210 to the lower bar 220 while between the upper bar 210 and lower bar 220 of the sealing unit 200, and a used tape retrieval reel 340, which may wind and retrieve the used sealing tape 10.

That is, the tape supply reel 300 and the used tape retrieval reel 340 can rotate simultaneously, enabling a simultaneous supply and retrieval of the sealing tape 10. Here, the tape supply reel 300, protective tape retrieval reel 310, tape supply roller 320, guide roller 330, and used tape retrieval reel 340 can be controlled to rotate such that the sealing tape 10 is supplied to the sealing unit 200 while maintaining a certain tension.

The sealing tape 10 applied to this type of apparatus for securely sealing a packaging according to still another embodiment of the present invention can include extension areas 15 formed on both sides along the lengthwise direction, as illustrated in FIG. 12. When the sealing tape 10 is joined to the plastic packaging 30, the original area 18 of the sealing tape 10 can be cut.

Figure 13:
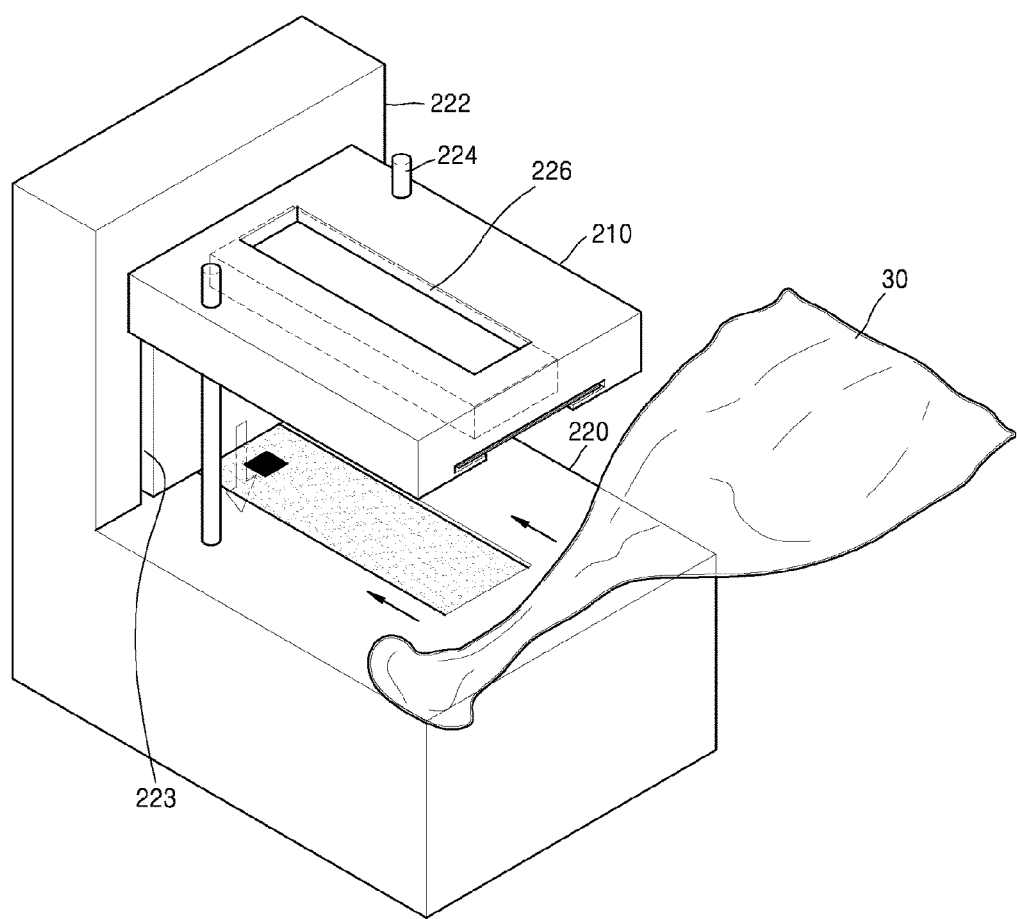
FIG. 13 illustrates the composition of a sealing unit according to another embodiment of the present invention.

FIG. 13 illustrates the composition of a sealing unit according to another embodiment of the present invention. In describing FIG. 13, certain descriptions may be omitted for components that are substantially the same as those of the apparatus for securely sealing a packaging according to an embodiment of the present invention described above with reference to FIG. 1.

Referring to FIG. 13, an apparatus for securely sealing a packaging 200 according to this embodiment can include a first bar 210 positioned at an upper location, a second bar 220 positioned at a lower location, a side bar 222, and a guard rod 224. Here, the RFID writer 225 and the control unit (not shown), described above with reference to FIG. 1, may preferably be positioned inside the second bar 220. The data receiver unit (not shown) may also be positioned within the second bar 220, and when data is received via wired communication from the data generation unit 100, which may be an integrated part of or a separately provided device for an apparatus for securely sealing a packaging according to an embodiment of the invention, the data receiver unit (not shown) may receive data from the data generation unit 100 through a communication port exposed at the exterior of the second bar 220 or the side bar 222. Furthermore, the tape supply reel 300 and the tape supply roller 320 for transporting the sealing tape 10 wound around the tape supply reel 300 may also preferably be disposed within the second bar 220. The second bar 220 may preferably be manufactured with a type of door formed on one side, to that a new roll of sealing tape 10 may be mounted on the tape supply reel 300 when the previous sealing tape 10 is expended.

In this embodiment, the side bar 222 may serve as a tape guide part that guides the sealing tape 10 supplied through the second bar 220 such that the sealing tape 10 is supplied to the first bar 210 positioned at an upper location. Also, a guide groove 223 for allowing an oscillating motion of the first bar 210 may be formed in one side of the side bar 222. While the setup having a guide groove 223 formed in the side bar 222 is disclosed as an example of a structure that allows an up/down oscillating motion for the first bar 210, any of a variety of widely known structures can be adopted for the up/down oscillating motion of the first bar 210.

As illustrated in FIG. 13, the sealing tape 10 may be supplied from the tape supply reel 300, passing across the side bar 222 along the guide groove 225 formed in the second bar 220, to the first bar 210 side.

After the plastic packaging 30 is positioned between the first bar 210 and the second bar 220, the first bar 210 may be moved downward to seal the opening part of the plastic packaging 30.

Considering that the operator would generally position the plastic packaging 30 between the first bar 210 and the second bar 220 while keeping the plastic packaging 30 in contact with the second bar 220, it may be preferable that the upper surface of the sealing tape 10 positioned at the second bar 220 during the sealing of the opening part of the plastic packaging 30 be a non-application area where there is no adhesive applied. Also, for the efficiency of the RFID writing process, it may be preferable that the section where the RFID tag 20 is attached (RFID tag section) be positioned at the second bar 220. If the RFID writer 225 is positioned at the first bar 210, which moves up and down along the guide groove 223 formed in the side bar 222, then the data transmission cable for transmitting data to the RFID writer 225 and the power cable for supplying electrical power would have to move together with the movement of the RFID writer 225, rending the structure of the apparatus more complicated. Thus, it may be preferable that the RFID writer 225 be arranged inside the second bar 220, especially at a lower position in an area between the side bar 222 and the guard rod 224. Correspondingly, the RFID tag 20 attached to the sealing tape 10 may also be positioned in an area between the side bar 222 and the guard rod 224. This is to prevent the RFID tag 20 from sticking to the plastic packaging 30 instead of the adhesion surface where the adhesive is applied. By virtue of the above composition, the plastic packaging 30 may be prevented by the guard rod 224 from invading the area where the RFID tag 20 is positioned when the operator positions the plastic packaging 30 between the first bar 210 and the second bar 220, and the adhesive application area of the sealing tape 10 positioned at a lower portion of the first bar 210 may directly contact the RFID tag 20 after the first bar 210 moves down.

In consideration of the above, it may be preferable to have the adhesive applied on the adhesion surface of the sealing tape 10 positioned at the first bar 210 but do not have the adhesive applied on the adhesion surface of the sealing tape 10 positioned at the second bar 220 during the sealing of the opening part of the plastic packaging 30.

Figure 14:
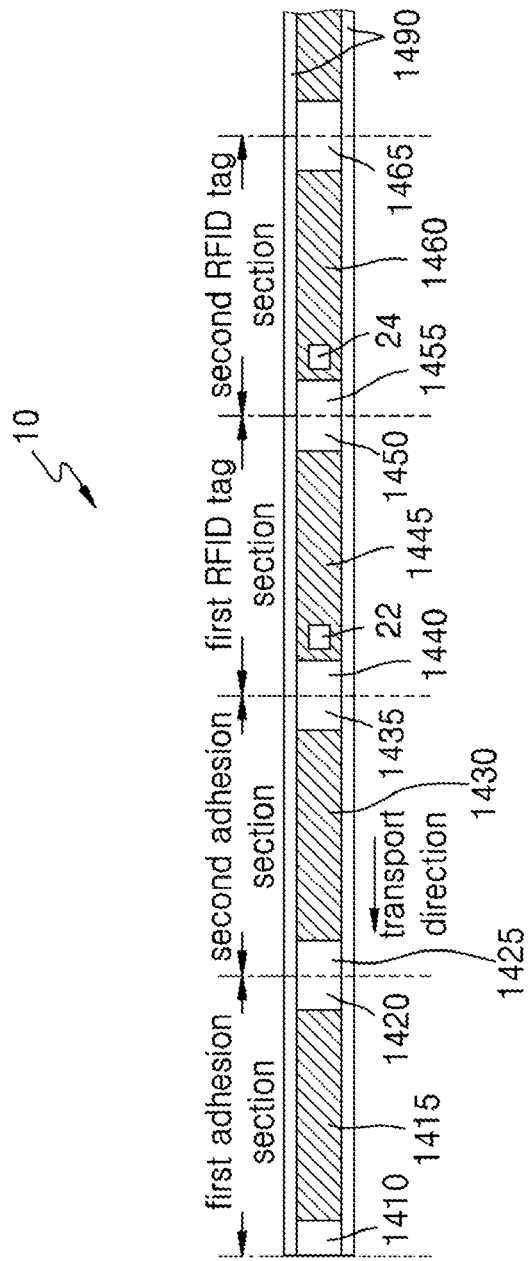
FIG. 14 illustrates the composition of a sealing tape utilized in the apparatus for securely sealing a packaging shown in FIG. 13.

FIG. 14 illustrates the composition of a sealing tape utilized in the apparatus for securely sealing a packaging shown in FIG. 13.

Referring to FIG. 14, a sealing tape 10 according to another embodiment of the present invention may have a first adhesion section, a second adhesion section, a first RFID tag section, and a second RFID tag section arranged sequentially. These basic sections including the first adhesion section, second adhesion section, first RFID tag section, and second RFID tag section may be repeated and wound around the tape supply reel. Here, it may be preferable to that the first adhesion section, second adhesion section, first RFID tag section, and second RFID tag section have the same lengths. At both ends of the first adhesion section and of the second adhesion section, there may be adhesive non-application areas 1410 and 1420, 1425 and 1435 formed, where adhesive is not applied, while at other areas, there may be adhesive application areas 1415, 1430 formed, where adhesive is applied. At both ends of the first RFID tag section and of the second RFID tag section also, there may be adhesive non-application areas 1440 and 1450, 1445 and 1465 formed, where adhesive is not applied, while at other areas, there may be adhesive application areas 1445, 1460 formed, where adhesive is applied. The RFID tags 22, 24 may be arranged at the front ends of the adhesive application areas 1445, 1460 of the corresponding first RFID tag section and second RFID tag section, respectively.

In the embodiment of the sealing tape 10 illustrated in FIG. 14, an extension area 1490 where there is no adhesive applied can be formed on one side or on both sides along the lengthwise direction, similarly to the embodiment described above with reference to FIG. 6 and FIG. 7, to be used for transporting the sealing tape 10. Also, in order to provide control such that the sealing tape 10 is arranged at an appropriate position on the apparatus for securely sealing a packaging, sensing holes can be formed in certain intervals in the extension area 1490. In a manner similar to that of the embodiment described above with reference to FIG. 6 and FIG. 7, the sensing holes can be used for transporting the sealing tape 10. Moreover, the sensing holes can be formed in a lengthwise direction in the sealing tape 10 itself instead of the extension area 1490 of the sealing tape 10.

Figure 15:
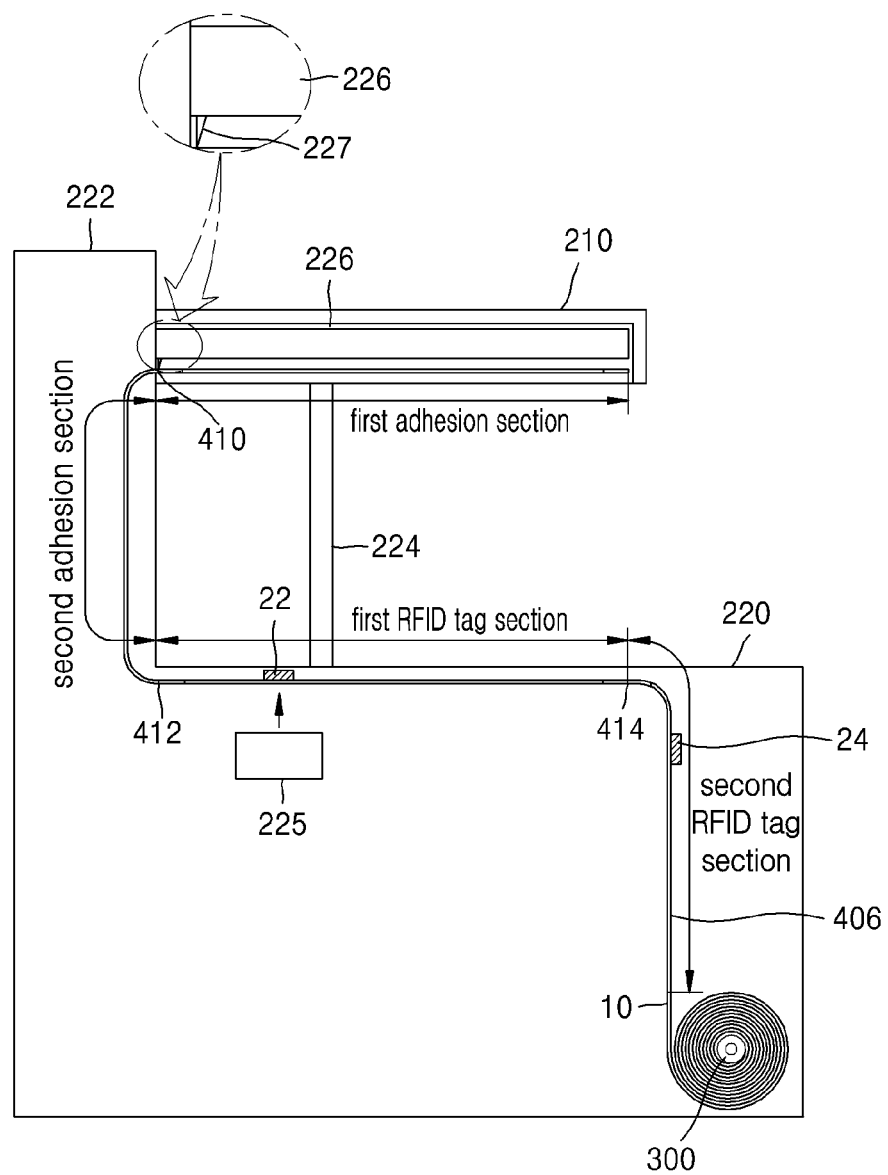
FIG. 15 illustrates a sealing operation by the apparatus for securely sealing a packaging shown in FIG. 13.

FIG. 15 illustrates a sealing operation by the apparatus for securely sealing a packaging shown in FIG. 13.

Referring to FIG. 15, when the opening part of the plastic packaging 30 is to be sealed, the first adhesion section of the sealing tape 10 may be arranged on the first bar 210, and the second adhesion section may be arranged on the side bar 222. Also, the first RFID tag section, in which a first RFID tag 22 for recording the price information is included, may be arranged at the recording position of the second bar 220, and the second RFID tag section, in which a second RFID tag 24 that will be used next is included, may be arranged on the inside of the second bar 220. When the arrangement of the sealing tape 10 is completed thus, the RFID writer 225 may record the price information onto the first RFID tag 22.

After the sealing tape 10 is arranged as illustrated in FIG. 15, the boundary portion 410 between the first adhesion section and the second adhesion section may be cut, and also the boundary portion 412 between the second adhesion section and the first RFID tag section and the boundary portion 414 between the first RFID tag section and the second RFID tag section may be cut, either before or during the sealing operation. For such cutting of the boundary portions 410, 412, 414, cutting devices (not shown) can be provided at the respective points corresponding to the boundary portions 410, 412, 414 on the first bar 210 and second bar 220. In this case, the side bar 222 may preferably be modified in height such that the boundary portion 410 between the first adhesion section and the second adhesion section and the boundary portion 412 between the second adhesion section and the first RFID tag section are positioned within the side bar 222, for easier installing of the cutting devices. Thus, the cutting devices for cutting the boundary portion 410 between the first adhesion section and the second adhesion section and the boundary portion 412 between the second adhesion section and the first RFID tag section may both be arranged inside the side bar 222. Of course, by appropriately changing the height of the side bar 222, it is also possible to implement the setup such that the boundary portion 410 between the first adhesion section and the second adhesion section is positioned inside the side bar 222 and the boundary portion 412 between the second adhesion section and the first RFID tag section is positioned inside the second bar 220. In this case, the cutting device for cutting the boundary portion 410 between the first adhesion section and the second adhesion section may be arranged within the side bar 222, and the cutting device for cutting the boundary portion 412 between the second adhesion section and the first RFID tag section may be arranged within the second bar 220.

In cases such as that illustrated in FIG. 15 where a pressing part 226 is provided, a cutting blade may be attached on the lower surface at one end or both ends of the pressing part 226 to cut the boundary portions 410, 412, 414 during the sealing operation. For example, in cases where a cutting blade 227 is attached only at the left end of the pressing part 226 close to the side bar 222, the pressing part 226 may first be moved down, before the first bar 210 is moved down, to first cut the boundary portion 410 between the first adhesion section and the second adhesion section. Here, the pressing part 226 may move down only up to a certain position for cutting the boundary portion 410 between the first adhesion section and the second adhesion section and preferably may not touch the sealing tape 10 positioned in the first bar 210. Next, when the first bar 210 is moved down so that the lower surface of the first bar 210 touches the upper surface of the second bar 220, the pressing part 226 may again be moved down such that the first adhesion section and the first RFID tag section of the sealing tape 10 are adhered. Here, the cutting blade 227 attached at the left end of the pressing part 226 may cut the boundary portion 412 between the second adhesion section and the first RFID tag section, and the boundary portion 414 between the first RFID tag section and the second RFID tag section may be cut by a cutting device (not shown) provided at a point corresponding to the boundary portion 414. Alternatively, in cases where there are cutting blades 227 mounted on the lower surfaces at both ends of the pressing part 226, the pressing part 226 may cut the boundary portion 412 between the second adhesion section and the first RFID tag section and the boundary portion 414 between the first RFID tag section and the second RFID tag section simultaneously during the second downward movement, after the first bar 210 is moved down to cause the lower surface of the first bar 210 and the upper surface of the second bar 220 to touch each other.

When the first adhesion section and the first RFID tag section are adhered as described above and the plastic packaging 30 is removed from the apparatus for securely sealing a packaging, then the second adhesion section that was positioned at the side bar 222 may be transported to the recording position of the first bar 210, and the price information may be recorded by the RFID writer 225 onto the second RFID tag. The first bar 210 may be moved down to adhere the second adhesion section with the second RFID tag section and complete the sealing operation, and afterwards when the plastic packaging 30 is removed from the apparatus for securely sealing a packaging, the sealing tape 10 may be transported to the initial state.

If a cutting blade is installed on the side bar 222 or a cutting blade installed on the first bar 210, the first downward movement operation of the pressing part 226 for cutting the boundary portion 410 between the first adhesion section and second adhesion section may not be necessary. In cases where a cutting blade is installed on the side bar 222, the cutting blade may be installed at the point where the sealing tape 10 is drawn out from the side bar 222 to the first bar 210. Here, the first bar 210 may, as it moves downward, press the sealing tape 10 towards the second bar 220, and due to the pressure thus applied by the first bar 210 on the sealing tape 10, the sealing tape 10 may be cut by the cutting blade installed on the side bar 222. Alternatively, in cases where a cutting blade is installed on the first bar 210, the cutting blade may be installed at an end portion of the first bar 210 on the side bar 222 side. Here, the first bar 210 may, as it moves downward, cut the sealing tape 10 with the cutting blade installed on the first bar 210.

If the cutting blade installed on the pressing part 226, side bar 222, or first bar 210 is given an inclined form, the sealing tape 10 can be readily cut without having the sealing tape 10 pushed in a certain direction.

The width of the cutting blade 227 may preferably be greater than or equal to that of the sealing tape 10.

According to an embodiment of the present invention, the adhesive can be applied only in the adhesion sections and not in the RFID tag sections, for the convenience of the operator. However, the present invention is not limited thus, and it is also possible not to have the adhesive applied in the adhesion sections and have the adhesive applied in the RFID tag sections including the surfaces of the RFID tags.

As described above, the sealing tape 10 can include a first surface onto which the RFID tags may be attached and a second surface on the opposite side on which there is no adhesive applied.

In cases where the adhesive is applied on the surfaces of the RFID tags and not applied on the adhesion surface sections, the first surface may be the surface contacting the RFID tag during the sealing of the opening part of the plastic packaging, and the second surface may be the surface separated from the RFID tag when the sealing tape 10 is supplied from the tape supply reel 300, and as such, the roughness can be different for the first surface and the second surface.

Considering the circumstance described above, the roughness of the first surface can be greater than the roughness of the second surface, whereby when the RFID tag is separated from the second surface, the attachment strength between the RFID tag and the second surface may be too weak to damage the RFID tag, whereas the RFID tag can be broken when it is separated after being adhered to the first surface.

Figure 16:
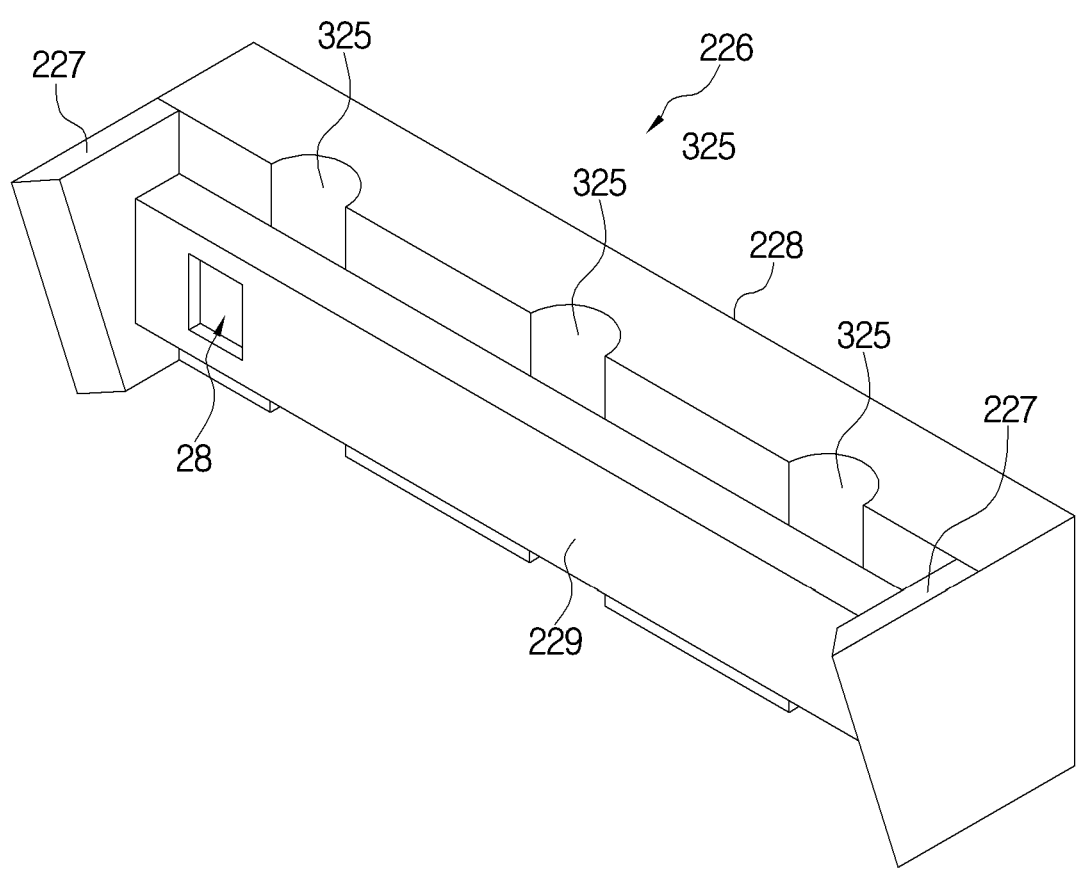
FIG. 16 illustrates the composition of a pressing part used in an apparatus for securely sealing a packaging according to another embodiment of the present invention.

Below, the operation of the pressing part 226, which undergoes an up/down oscillating motion inside the first bar 210, is described in further detail. FIG. 16 illustrates the detailed composition of the pressing part 226.

Referring to FIG. 16, the pressing part 226 may be composed of a base member 228, a pressing member 229, and cutting blades 227. The cutting blades 227 may be installed at both ends of the base member 228. It is also possible to install such a cutting blade 227 on only one end of the two ends of the base member 228, the end closer to the side bar 222. Also, it may be preferable to form a multiple number of supply roller holder indentations 325 in both sides of the base member 228 for holding the tape supply rollers 320. Such a composition can prevent the multiple tape supply rollers 320 attached on the inner surface of the first bar 210 from contacting the base member 228 when the pressing part 226 is moved down. The upper surface of the pressing member 229 may be attached and affixed to the lower surface of the base member 228. The pressing member 229 may preferably be made of an elastic material. In the lower surface of the pressing member 229, an RFID tag holder indentation 28 may preferably be formed, in a size capable of holding the RFID tag 20 and in an area corresponding to the RFID tag 20 attached onto the sealing tape 10 when the sealing tape 10 is arranged at the sealing position on the first bar 210. Here, the depth of the RFID tag holder indentation 28 may preferably be the same as the thickness of the RFID tag 20 or smaller than the thickness of the RFID tag 20.

Figure 17:
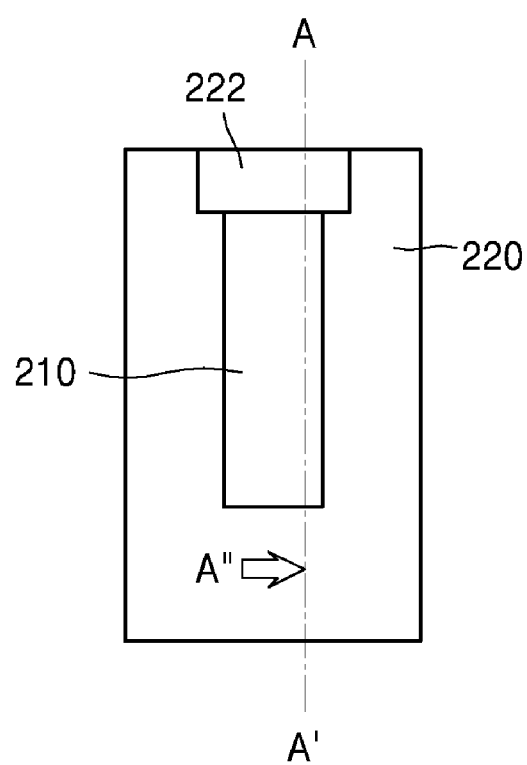
FIG. 17 and FIG. 18 are a plan view and a front view, respectively, of the pressing part shown in FIG. 16 coupled to the apparatus for securely sealing a packaging shown in FIG. 13.
Figure 18:
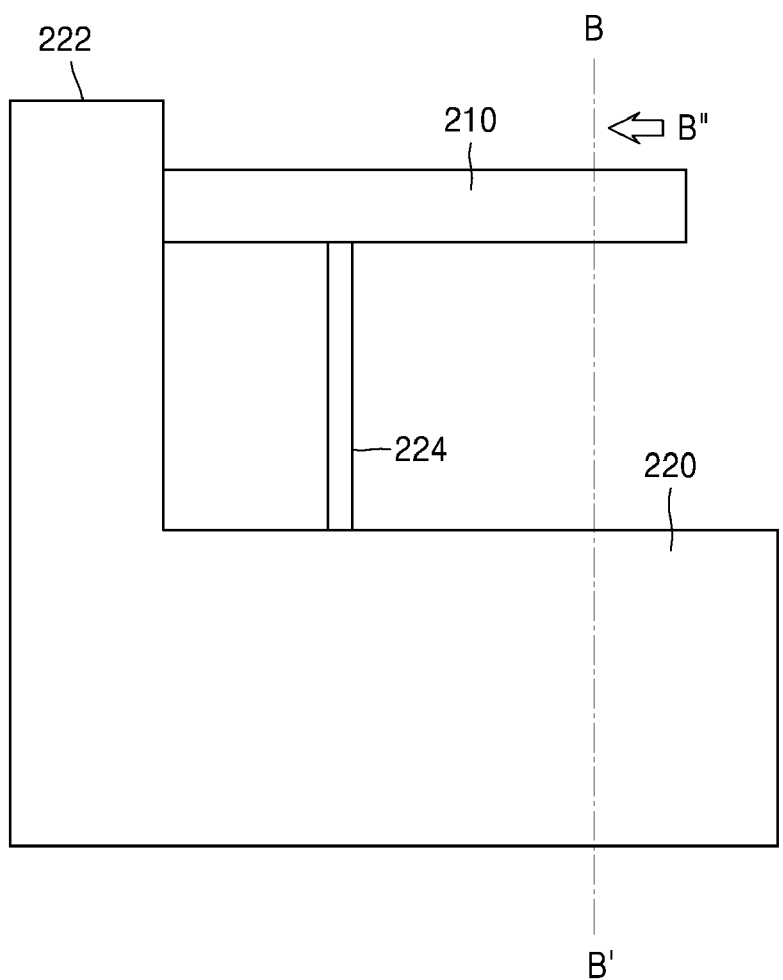
Figure 19:
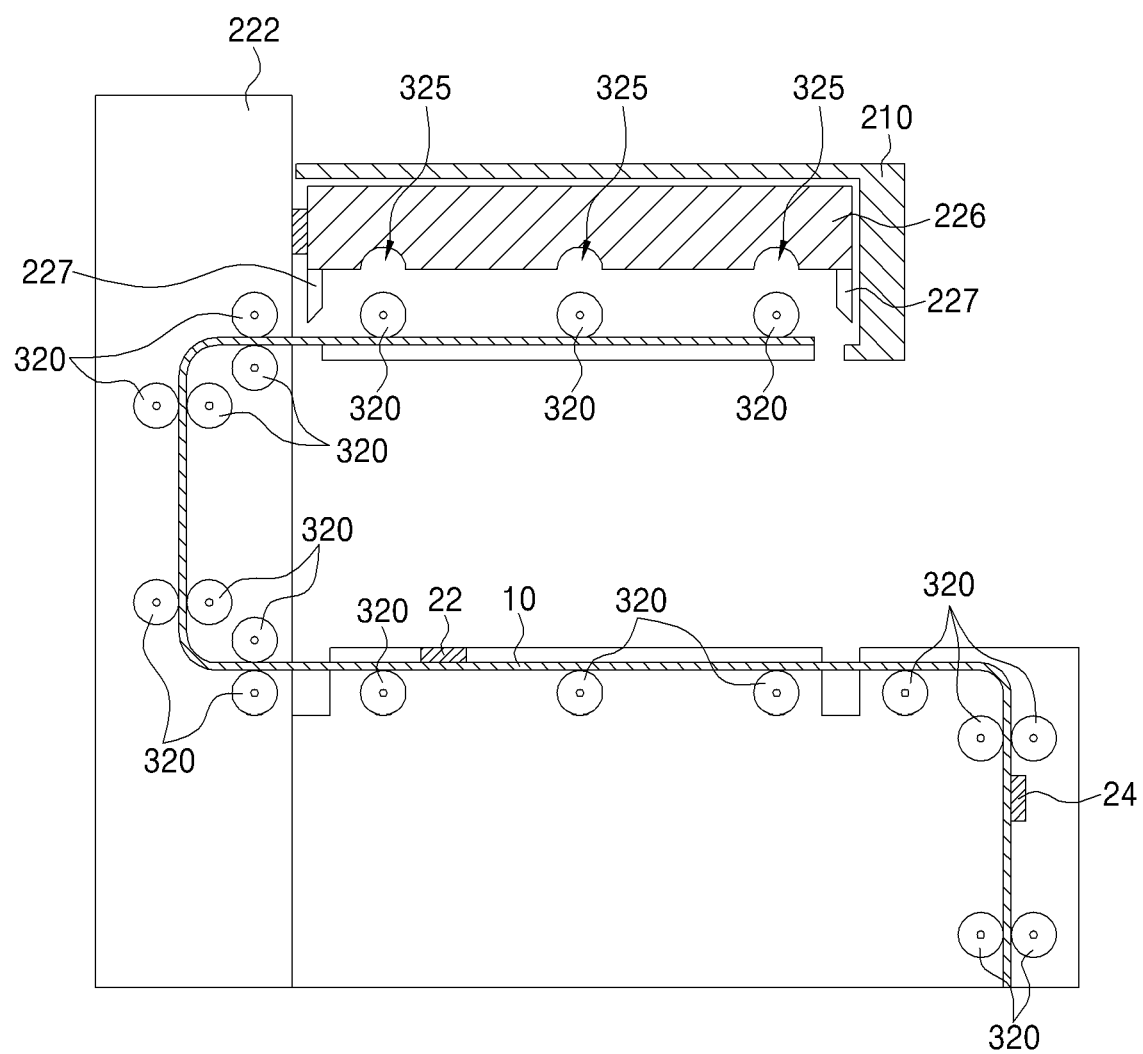
FIG. 19 is a vertical cross-sectional view across line A-A' as viewed in the direction of A" in the plan view shown in FIG. 17.
Figure 20:
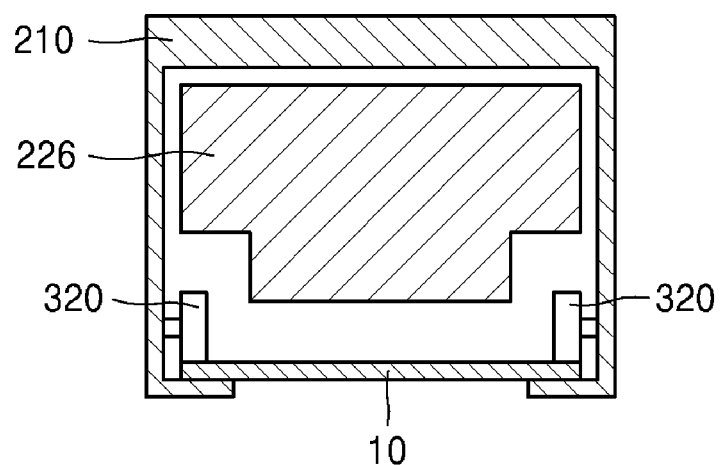
FIG. 20 is a horizontal cross-sectional view across line B-B' as viewed in the direction of B" in the front view shown in FIG. 18.

FIG. 17 and FIG. 18 are a plan view and a front view, respectively, of the pressing part shown in FIG. 16 coupled to the apparatus for securely sealing a packaging shown in FIG. 13. FIG. 19 is a vertical cross-sectional view across line A-A' as viewed in the direction of A" in the plan view shown in FIG. 17, and FIG. 20 is a horizontal cross-sectional view across line B-B' as viewed in the direction of B" in the front view shown in FIG. 18.

Referring to FIG. 17 through FIG. 20, when the first adhesion section of the sealing tape 10 is positioned at the first bar 210, the second adhesion section is positioned at the side bar 222, and the first RFID tag section is positioned at the second bar 220, then the setup may be ready for sealing a packaging. Here, the pressing part 226 may be held inside the first bar 210 and raised up. When the operator places the plastic packaging 30 carrying a product on a data generation unit 100, such as an electronic scale, and measures the weight of the plastic packaging 30 carrying a product, the price information may be received at an apparatus for securely sealing a packaging according to an embodiment of the present invention from the data generation unit 100. Accordingly, the RFID writer 225 may record the price information of the product onto the first RFID tag 22. When this operation of recording data is completed, the pressing part 226 may undergo a first downward movement, whereby the boundary portion 410 between the first adhesion section and the second adhesion section may be cut by the cutting blade 227 attached at the end closer to the side bar 222, from among the cutting blades 227 attached at both ends of the pressing part 226. Here, the pressing part 226 may preferably be moved downward to the extent that the lower surface of the pressing member 229 does not touch the first adhesion section of the sealing tape 10. Next, the first bar 210 and the pressing part 226 may move downward at the same speed until the lower surface of the first bar 210 and the upper surface of the second bar 220 touch each other. When the lower surface of the first bar 210 touches the upper surface of the second bar 220, the pressing part 226 may undergo a second downward movement to adhere the first adhesion section of the sealing tape 10 with the first RFID tag section. Here, the boundary portion 412 between the second adhesion section and the first RFID tag section and the boundary portion 414 between the first RFID tag section and the second RFID tag section may be cut by the cutting blade 227 attached at both ends of the pressing part 226.

Figure 21:
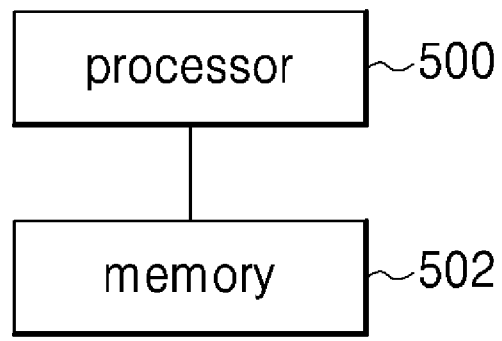
FIG. 21 illustrates the composition of an apparatus for securely sealing a packaging according to yet another embodiment of the present invention.

FIG. 21 illustrates the composition of an apparatus for securely sealing a packaging according to an embodiment of the present invention.

Referring to FIG. 21, an apparatus for securely sealing a packaging can include a processor 500 and a memory 502.

The processor 500 can include a CPU (central processing unit) or a virtual machine, etc., that is capable of running a computer program.

The memory 502 can include a non-volatile storage device such as a fixed type hard drive or a removable storage device. A removable storage device can include a compact flash unit, a USB memory stick, etc. The memory 502 can also include volatile memory such as various types of random access memory.

The memory 502 may store program instructions executable by the processor 500.

A memory 502 according to this embodiment may store program instructions that can be executed by the processor such that the tape supply reel 300 supplies a sealing tape 10 having multiple RFID tags 20 attached thereto to the RFID writer 225 side, the RFID writer 225 records price information associated with the product contained in the plastic packaging 30 onto a first RFID tag from among the multiple RFID tags, and the sealing unit 200 seals the opening part of the plastic packaging 30 with the sealing tape 10.

The embodiments of the present invention set forth above are disclosed only for illustrative purposes. The person having ordinary skill in the art familiar with the present invention would be able to make various modifications, alterations, and additions without departing from the spirit and scope of the present invention, and such modifications, alterations, and additions are to be regarded as being encompassed by the scope of claims set forth below.

What is claimed is:

1. An apparatus for securely sealing a plurality of packaging materials, the apparatus comprising:
a tape supply reel configured to supply a sealing tape, the sealing tape having basic sections repeatedly arranged on an adhesive side and including a first adhesion section, a second adhesion section, a first RFID tag section to which a first RFID tag is attached, and a second RFID tag section to which a second RFID tag is attached;
an RFID writer configured to record price information onto the RFID tags, the price information related with one or more products contained in each packaging material;
a sealing unit configured to seal an opening part of the packaging material with the sealing tape; and
a control unit configured to control a tape supply operation of the tape supply reel, a writing operation of the RFID writer, and a sealing operation of the sealing unit,
wherein the sealing unit comprises:
a first bar;
a second bar arranged facing the first bar and placed in tight contact with the first bar during sealing of the opening part of the packaging material; and
a side bar coupled to one end of the first bar and one end of the second bar, the side bar having a guide groove formed therein for guiding the first bar when the first bar moves between a first position on which the sealing tape is supplied to the first bar through the side bar and a second position on which the opening part of the packaging material is sealed with the sealing tape, the side bar configured to guide the sealing tape supplied through the second bar such that the sealing tape is supplied to the first bar,
wherein the control unit controls the tape supply real, the RFID writer and the sealing unit such that:
the tape supply reel supplies a sealing tape along with a supplying path composed of the second bar, the side bar and the first bar,
the RFID writer records price information onto the first RFID tag when the first adhesion section, the second adhesion section and the first RFID tag section are located in the first bar, the side bar and the second bar, respectively, the price information associated with a product contained in a packaging, and
the sealing unit seals the opening part of the packaging material with the sealing tape by moving the first bar toward the second bar before or after the writing operation of the RFID writer is completed,
wherein the second adhesion section and the second RFID tag section are moved to the first bar, the second bar, respectively, when the sealing operation of the sealing unit is completed, and then the writing operation of the RFID writer and the sealing operation of the sealing unit are re-performed, and
wherein each RFID tag is damaged and no longer function in case of detaching the sealing tape after the opening part of the packaging material is sealed.

2. The apparatus of claim 1, wherein a cutting blade is installed at the end of the first bar on the side of the side bar, the cutting blade cuts the border between the first adhesion section and the second adhesion section and the border between the second adhesion section and the first RFID tag section when the first bar moves toward the second bar.

3. The apparatus of claim 1, wherein cutting blades are installed at both ends of the first bar, a first cutting blade cuts the border between the first adhesion section and the second adhesion section and the border between the second adhesion section and the first RFID tag section, and a second cutting blade cuts the border between the first RFID tag section and the second RFID tag section when the first bar moves toward the second bar.

4. The apparatus of claim 1, wherein the sealing unit further comprises one or more guard rods adjacent to and apart from the side bar, and the RFID writer is arranged at an area between the side bar and the guard rods and inside the second bar.

5. The apparatus of claim 1, wherein the first bar has a pressing unit inside, the pressing unit configured to press the first adhesion section to attach the first adhesion section to the first RFID tag section when the first bar contacts with the second bar.

6. The apparatus of claim 5, wherein a cutting blade is installed at an end portion of the pressing unit on the side bar, the cutting blade cuts the border between the first adhesion section and the second adhesion section and the border between the second adhesion section and the first RFID tag section when the first bar contacts with the second bar.

7. The apparatus of claim 5, wherein cutting blades are installed at both end portions of the pressing unit, a first cutting blade cuts the border between the first adhesion section and the second adhesion section and the border between the second adhesion section and the first RFID tag section, and a second cutting blade cuts the border between the first RFID tag section and the second RFID tag section when the first bar contacts with the second bar.

* * * * *